US009443000B2

(12) United States Patent
Hall et al.

(10) Patent No.: US 9,443,000 B2
(45) Date of Patent: Sep. 13, 2016

(54) METHOD FOR CATEGORIZING OPEN-ENDED COMMENTS

(71) Applicants: Gene Cook Hall, Mountain View, CA (US); Mahalingeshwara Bhat Saravu, Fremont, CA (US); Lee Parnell, Manor, TX (US)

(72) Inventors: Gene Cook Hall, Mountain View, CA (US); Mahalingeshwara Bhat Saravu, Fremont, CA (US); Lee Parnell, Manor, TX (US)

(*) Notice: Subject to any disclaimer, the term of this patent is extended or adjusted under 35 U.S.C. 154(b) by 132 days.

(21) Appl. No.: 14/225,690

(22) Filed: Mar. 26, 2014

(65) Prior Publication Data

US 2015/0278337 A1   Oct. 1, 2015

(51) Int. Cl.
*G06F 3/048* (2013.01)
*G06F 17/30* (2006.01)
*G06F 3/0482* (2013.01)
*G06F 17/24* (2006.01)
*G06Q 30/02* (2012.01)

(52) U.S. Cl.
CPC ....... *G06F 17/30598* (2013.01); *G06F 3/0482* (2013.01); *G06F 17/241* (2013.01); *G06Q 30/02* (2013.01)

(58) Field of Classification Search
None
See application file for complete search history.

(56) References Cited

U.S. PATENT DOCUMENTS

| | | | | |
|---|---|---|---|---|
| 5,537,618 A * | 7/1996 | Boulton | ............... | G06F 11/3055 434/118 |
| 8,402,357 B1 * | 3/2013 | Norwood | ............ | G06F 17/2247 715/202 |
| 8,554,647 B1 * | 10/2013 | Grigg | ..................... | G06Q 40/02 701/469 |
| 2010/0023380 A1 * | 1/2010 | Anderson | .......... | G06Q 30/0203 705/7.32 |
| 2011/0106721 A1 * | 5/2011 | Nickerson | ............... | G06Q 30/02 705/347 |
| 2014/0188889 A1 * | 7/2014 | Martens | ............ | G06F 17/30598 707/740 |
| 2014/0304774 A1 * | 10/2014 | Bejerasco | ............... | H04L 63/10 726/3 |

\* cited by examiner

*Primary Examiner* — Hua Lu
(74) *Attorney, Agent, or Firm* — Plager Schack, LLP

(57) ABSTRACT

Some embodiments include a novel method for categorizing open-ended comments. The method relies on a person who originally made a comment to put the comment into a category. In some embodiments, the method receives a comment in response to an open-ended question, displays a set of categories that have been evaluated and determined to be likely to match a category for the received comment, receives a respondent-determined category for the comment, and categorizes the comment based on the respondent-determined category. This captures the category immediately after the comment is made with a high degree of accuracy.

8 Claims, 3 Drawing Sheets

METHOD FOR CATEGORIZING OPEN-ENDED COMMENTS

BACKGROUND

Embodiments of the invention described in this specification relate generally to categorization, and more particularly, to categorization of open-ended comments.

When a survey sponsor provides a forum for commenting, typically the survey sponsor is interested in identifying the types of comments being made in the forum. Generally, survey sponsors will identify types of comments through one or more categorization methods. However, categorizing comments is a time-consuming and expensive process. To date, the existing methods of categorizing comments have been error prone. One method requires survey sponsors to read comments and categorize them. This method is tedious, time-consuming and expensive because each comment must be individually read and categorized. Furthermore, because a person who reads a comment on behalf of the survey sponsor is typically not the person who conceived of or wrote the comment, the person's categorization of the comment can be inaccurate. Other methods are driven by lower-cost but complex algorithms which sometimes make errors.

What is needed is a way to accurately and immediately categorize comments.

BRIEF DESCRIPTION

Some embodiments of the invention include a novel method for categorizing open-ended comments. The method relies on a person who originally made a comment to put the comment into a category. In this way, the method captures the category immediately after the comment is made with a high degree of accuracy.

In some embodiments, the method receives a comment in response to an open-ended question, displays a set of categories that have been evaluated and determined to be likely to match a category for the received comment, receives a respondent-determined category for the comment, and categorizes the comment based on the respondent-determined category.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
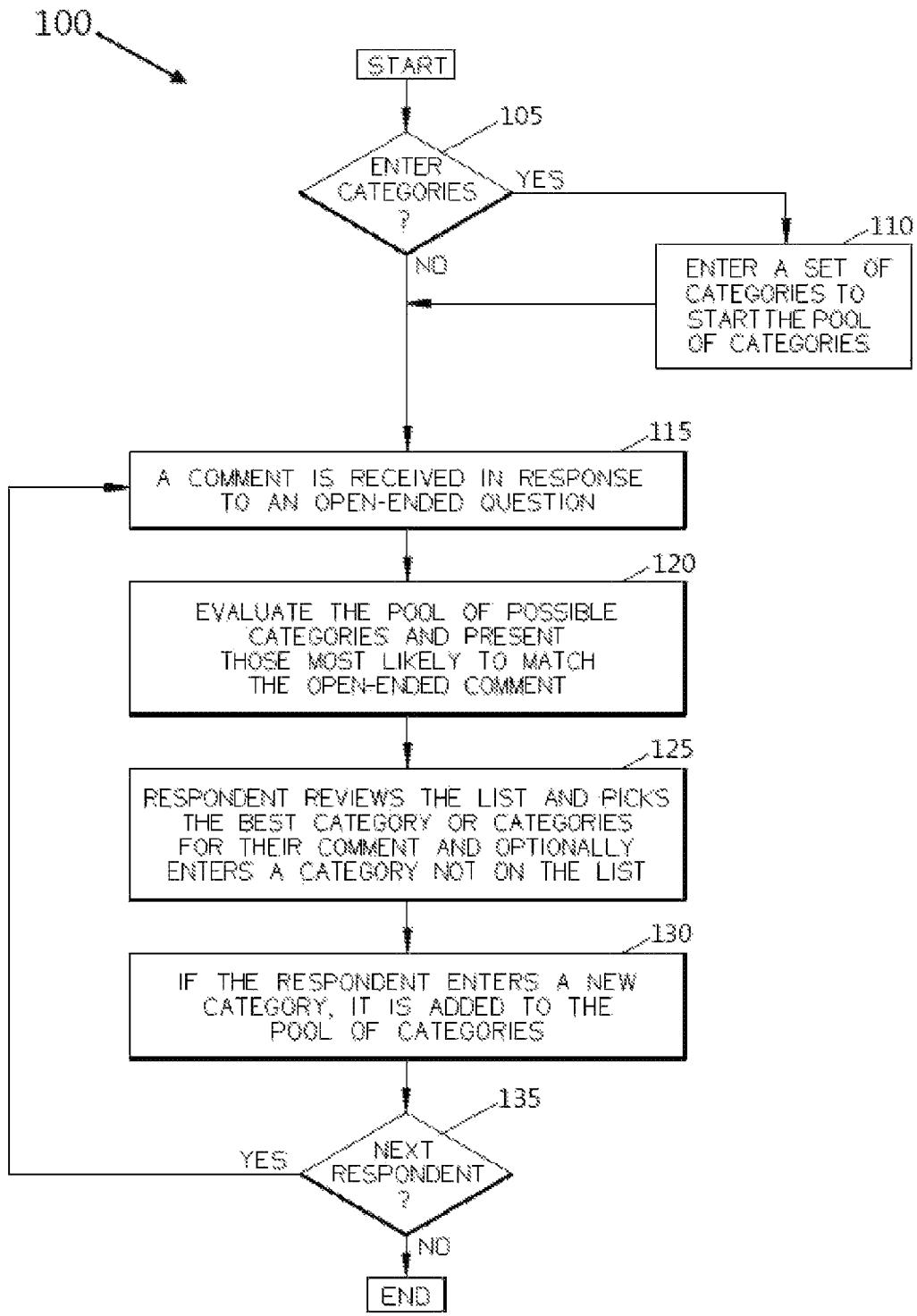
FIG. 1 conceptually illustrates a process in some embodiments for categorizing open-ended comments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel method for categorizing open-ended comments. The method relies on a person who originally made a comment to put the comment into a category. In this way, the method captures the category immediately after the comment is made with a high degree of accuracy.

In some embodiments, the method receives a comment in response to an open-ended question, displays a set of categories that have been evaluated and determined to be likely to match a category for the received comment, receives a respondent-determined category for the comment, and categorizes the comment based on the respondent-determined category.

In some embodiments, the method is implemented as a software application that includes sets of instructions for performing the steps of the method when the software application is running on a processor of a computing device. In some embodiments, the software application accesses one or more computing devices over the Internet. In some embodiments, the software application connects to a web application server that accesses one or more social media websites and a persistent data storage. In some embodiments, the persistent data storage is a database accessible through a database management system running on the processor of the computing device on which the software application is running. In some embodiments, the software application is a client-side application that accesses a cloud database management system.

As stated above, categorizing comments is a time-consuming and expensive process which is prone to errors. Embodiments of the invention described in this specification solve such problems by allowing survey respondents to classify their own comments into categories.

The embodiments described in this specification differ from and improve upon currently existing options. In particular, embodiments of the invention described in this specification are faster in overall performance (i.e., categorizing several open-ended comments) and in categorizing each individual comment. Furthermore, the method of some embodiments involves lower costs of implementation and execution. The improvements over existing methods also include higher accuracy rates in terms of correctly categorizing comments. In some cases, these benefits are related to the manner in which the method allows a respondent who provides one or more comments to categorize the respondent's own comments. This results in higher accuracy of the categorized comments. Other methods are too expensive and/or prone to categorization errors. By categorizing comments from a source (i.e., the respondent who originally made the comment(s)) with immediate and direct knowledge of the comment(s), the method captures the identified category immediately after the comment is provided and with a high degree of certainty that the categorization is accurate.

The method of the present disclosure may be comprised of the following steps. This list of possible constituent steps is intended to be exemplary only and it is not intended that this list be used to limit the method of the present application to just these steps. Persons having ordinary skill in the art relevant to the present disclosure may understand there to be equivalent steps that may be substituted within the present disclosure without changing the essential function or operation of the method.

1. A comment in any form from any person is captured
2. A set of previous comments are selected
3. Based on categories entered by previous respondents, a list of most-likely categories is presented
4. The person who made the comment views the list and selects the correct category or categories or adds a new category The method for categorizing open-ended comments of the present disclosure generally works according to the steps listed above so that correct categories can be determined for future processing of comments.

By way of example, FIG. 1 conceptually illustrates a process in some embodiments for categorizing open-ended comments. The process will either start with a pool of categories or not. In some embodiments, a researcher or sponsor can enter a pool of categories before the process gets underway. But if the sponsor or researcher does not enter a pool of categories, the process ensues without any categories (at least until a respondent enters a category, as described below).

As shown in this figure, entering a pool of categories is a determination made (at 105) before the categorization of open-ended comments gets going. A research sponsor or researcher may specify a pool of categories because there may not be a list of categories from which to select a category. Thus, the sponsor or researcher may enter (at 110) the pool of categories. The process then transitions to 115, which is described below. On the other hand, the sponsor or researcher may not enter any categories. In this case, there may not be any categories entered before categorizing of open-ended comments gets started. Then the process simply moves on to receiving comments instead of entering categories at 110. A respondent would have to enter a category if no categories have been entered by the sponsor or researcher at 110 or by a previous respondent at 125.

The process 100 receives (at 115) a comment in response to an open-ended question. As noted above, in some embodiments a survey sponsor will post a question on an open forum for respondents to comment on. In order to categorize the received comment, in some embodiments the process 100 evaluates (at 120) the pool of categories in order to identify and present a category that is determined to be the most likely to match the open-ended comment. In some embodiments, a set of likely categories are identified and presented as possible matches to the received open-ended comment.

Next, the process 100 receives a category pick (at 125) based on a review of the categories by respondent. In some embodiments, the respondent selects a set of categories for the comment. In some embodiments, if a matching category is not available for the respondent to select, a new category is entered. In some of these embodiments, the respondent inputs a name for the new category, which the process 100 uses for the new category. In some embodiments, the process adds (at 130) the new category to the pool of categories and assigns the comment to the new category.

After the received comment is categorized, the process 100 may repeat if there are more comments. Thus, the process determines (at 135) whether there is another comment to categorize. Specifically, for each respondent who makes a comment, the process is repeated starting from 135 as described above. Otherwise, if there are no more respondents with comments to categorize, the process 100 ends.

To make the method for categorizing open-ended comments of the present disclosure, a person would need to develop a software application to perform the above-listed steps. As the process 100 of some embodiments can function in networked environments, any software application developed for the process 100 should be included in a networked system. For example, a software application that acts as a client application may be connected to a network, such as the Internet, and connect to a web server in order to perform one or more of the steps of the process 100.

Figure 2:
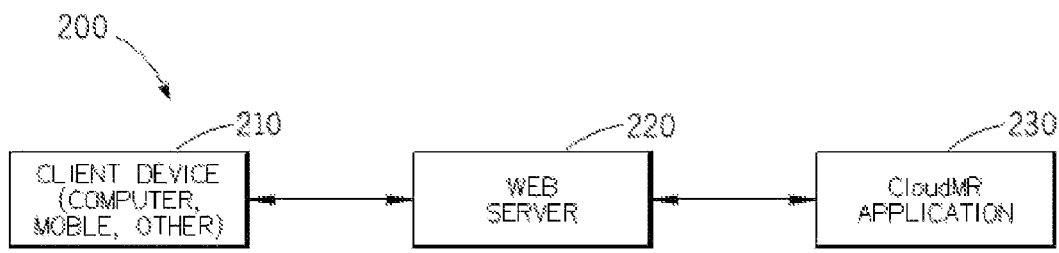
FIG. 2 conceptually illustrates a high level schematic view of a system architecture that facilitates categorizing comments in some embodiments.

By way of example, FIG. 2 conceptually illustrates a high level schematic view of a system architecture that facilitates prioritizing comments in some embodiments. As shown in this figure, the system 200 includes a client computing device 210, a web server 220, and a cloud manager application 230 operating on a back-end computing device. In some embodiments, the client computing device 210 connects over a network to the web server 220. By connecting to the web server 220, the client computing device can send and receive data. For instance, the client computing device 210 may send requests to the web server 220 for data that is provided by the cloud manager application 230. In some embodiments, the web server 220 processes requests for data that are received from client computing devices and communicates with the cloud manager application 230 (over the network), to retrieve/receive the requested data. After receiving the requested data from the cloud manager application 230, the web server 220 transmits the data to the appropriate requesting client computing device 210.

To use the method for categorizing open-ended comments of the present disclosure, a survey sponsor would need to determine when and where a comment is posted. Typically, a respondent in a research or other setting will make an open-ended comment. Following the comment, the respondent will answer an additional question indicating the general nature or category of their comment. The list of categories may be different depending on the number of categories picked by others earlier in the research process. The best possible category is selected by the person who made the original comment.

Additionally, in some embodiments the order could be changed so that the person selects the category they want to comment on before the comment is made. In some circumstances, it is desirable to get the top-of-mind comment before showing the person any categories which might affect their comment. Moreover, the method could be adapted for use in any field of technology that deals with open-ended comments in order to group comments into categories.

While a system architecture is described by reference to FIG. 2, above, in some embodiments, the architecture of the system 200 includes multiple client computing devices 210 and the cloud manager application running on the back-end computing device includes one or more databases, user and/or admin interfaces, and application programmer's interfaces (APIs).

Figure 3:
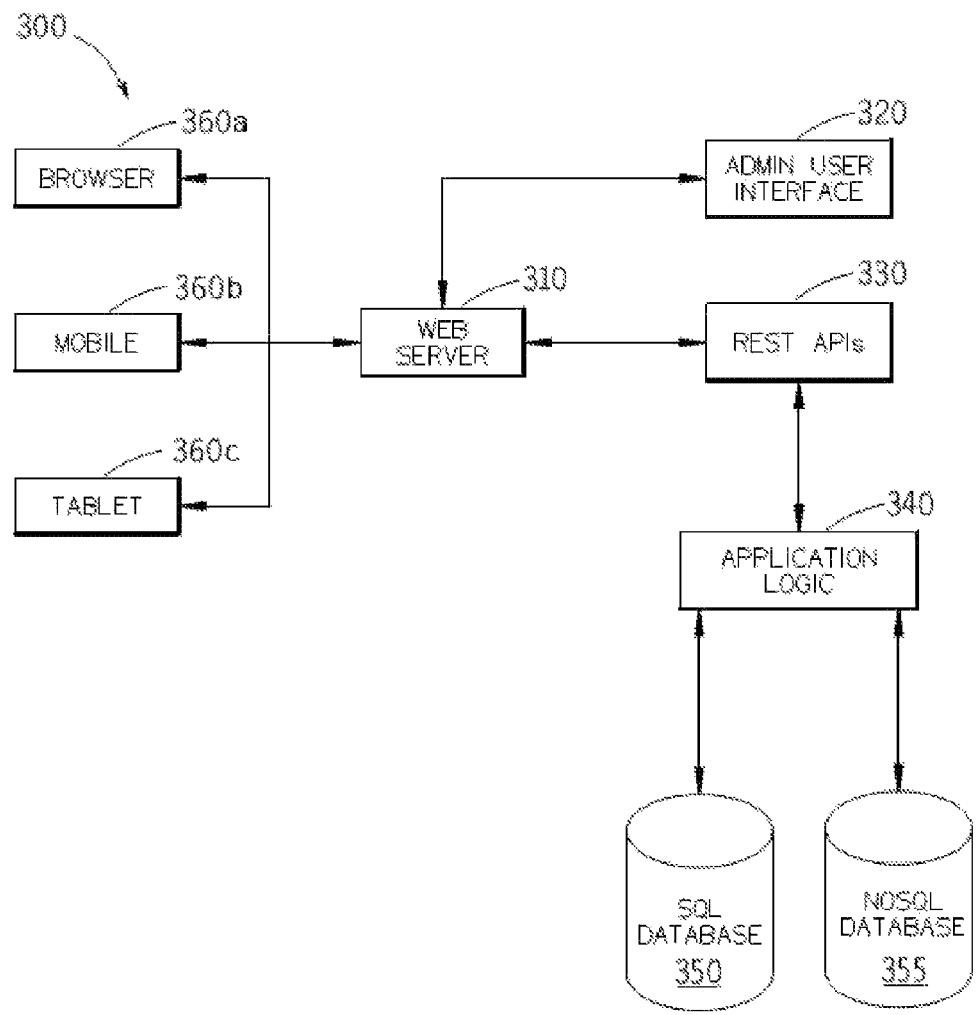
FIG. 3 conceptually illustrates a detailed schematic view of a system architecture that facilitates categorizing comments in some embodiments.

FIG. 3 conceptually illustrates a detailed schematic view of a system architecture that facilitates prioritizing comments in some embodiments. As shown in this figure, the system 300 includes a web server 310, a computing device that provides an admin user interface 320, a computing device that provides one or more rest APIs 330, a computing device that includes application logic 340, a database that supports Structured Query Language (SQL) 350, a NoSQL database 355, and a plurality of client computing devices 360a-360c. Each of the client computing devices 360a, 360b, and 360c connects to the web server 310 over a network, such as the Internet, to send and receive data. In some embodiments, the data is retrieved from either or both databases 350 and 355 via application logic 340 accessed through one or more of the rest APIs 330. In some embodiments, the rest API's are implemented on the web server and data is retrieved via application logic 340 that is implemented in a relational database management system (RDBMS). In this way, the web server 310 is able to facilitate prioritizing comments from any of several different client computing devices, including a browser application that operates on a computer 360a (e.g., a desktop computer, a laptop computer, etc.), a client app operating on a mobile computing device 360b, and a client app operating on a tablet computing device 360c.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
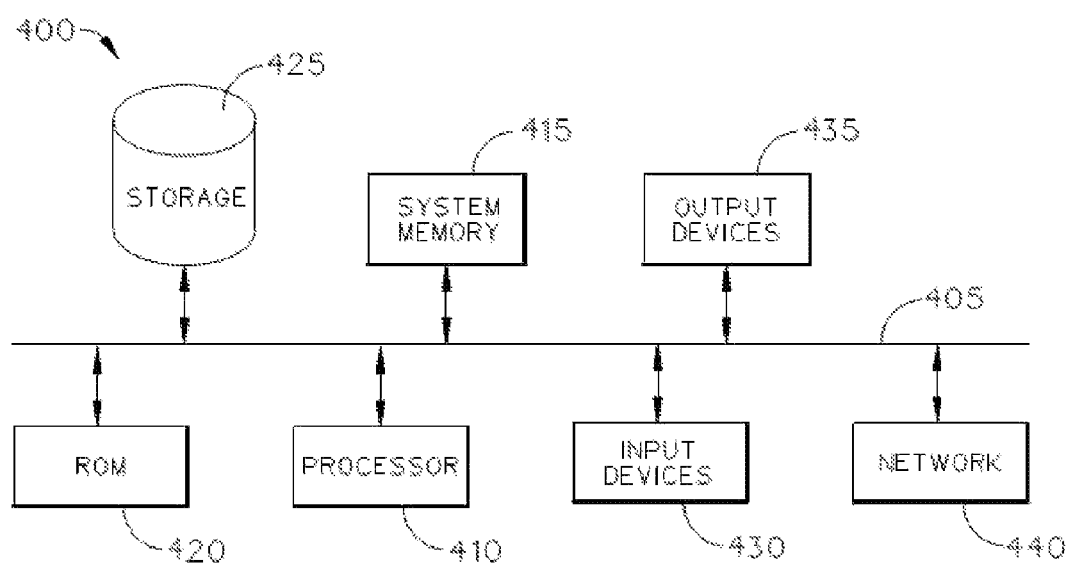
FIG. 4 conceptually illustrates an electronic system with which some embodiments of the invention are implemented.

FIG. 4 conceptually illustrates an electronic system 400 with which some embodiments of the invention are implemented. The electronic system 400 may be a computer, phone, PDA, or any other sort of electronic device. Such an electronic system includes various types of computer readable media and interfaces for various other types of computer readable media. Electronic system 400 includes a bus 405, processing unit(s) 410, a system memory 415, a read-only 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only 420. For example, the various memory units include instructions for processing appearance alterations of displayable characters in accordance with some embodiments. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards and pointing devices (also called "cursor control devices"). The output devices 435 display images generated by the electronic system 400. The output devices 435 include printers and display devices, such as cathode ray tubes (CRT) or liquid crystal displays (LCD). Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates a process for categorizing open-ended comments. The specific operations of the process 100 may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A comment categorization system that categorizes comments received in response to open-ended questions, said comment categorization system comprising:
    a respondent client computing device comprising a processor, a memory, a display screen, and a non-transitory computer readable storage medium storing a respondent client program which when executed by the processor provides comments to open-ended questions for categorization, said respondent client program comprising sets of instructions for:
        displaying an open-ended question on the display screen;
        receiving a comment related to the open-ended question;
        providing the comment for category evaluation;
        receiving a set of category identifiers associated with a set of categories identified as likely to match the comment related to the open-ended question;
        receiving a selection of a particular category identifier from the set of category identifiers; and
        providing the particular category identifier for categorization of the comment; and
    a server computing device comprising a server processor, a server memory, and a non-transitory computer readable medium storing a comment categorization program which when executed by the server processor performs a comment categorization service, said comment categorization program comprising sets of instructions for:
        receiving, from the respondent client computing device, the comment for category evaluation;
        identifying a set of categorized comments related to the received comment;
        retrieving a set of category identifiers from the set of categorized comments related to the received comment;
        identifying, from a pool of categories, the set of categories likely to match the received comment, wherein each category in the identified set of categories comprises a category identifier, wherein the identified set of categories likely to match the received comment comprises categories of the retrieved set of category identifiers;
        providing the category identifiers of the identified set of categories to the respondent client computing device;
        receiving, from the respondent client computing device, the particular category identifier for categorization of the received comment; and
        categorizing the received comment in a particular category associated with the particular category identifier.

2. The comment categorization system of claim 1 further comprising an administrative researcher computing device comprising an admin processor, an admin memory, an admin display screen, and a non-transitory computer readable storage medium storing an admin program which when executed by the admin processor provides an administrative researcher user interface for preparing a comment categorization program to categorize comments received in response to open-ended questions, said admin program comprising a set of instructions for entering a set of categories to start the pool of categories.

3. The comment categorization system of claim 1 further comprising a set of databases that store comments and categories, wherein the set of category identifiers received at the respondent client computing device comprises a new category identifier, wherein the set of instructions of the respondent client program for receiving the selection of the particular category identifier comprises a set of instructions for determining whether the particular category identifier is the new category identifier.

4. The comment categorization system of claim 3, wherein the set of instructions of the respondent client program for receiving the selection further comprises a set of instructions for displaying a new category user input field when the particular category identifier is the new category identifier.

5. The comment categorization system of claim 4, wherein the set of instructions of the respondent client program for providing the particular category identifier for categorization of the comment further comprises sets of instructions for:
    retrieving text input from the new category user input field; and
    providing the new category identifier and the retrieved text input to the server computing device for the comment categorization program to add the new category to the pool of categories.

6. The comment categorization system of claim 5, wherein the comment categorization program further comprises sets of instructions for:
    receiving the new category identifier and the retrieved text input;
    creating a new category comprising a new category identifier;
    setting the new category identifier to the text input;
    adding the new category to the pool of categories; and
    storing the new category in relation to the pool of categories in the set of databases.

7. The comment categorization system of claim 1 further comprising an application logic module that determines whether a selection of a particular category is received as a selection from a respondent associated with the received comment.

8. The comment categorization system of claim 7, wherein the comment categorization program of the server computing device further comprises sets of instructions for:
   setting a status of the received comment to a status of a categorized comment;
   setting an association of the categorized comment to the respondent;
   storing the categorized comment in the set of databases; and
   determining the next respondent to proceed with categorizing comments.

\* \* \* \* \*